STEREOPHONIC SOUND REPRODUCING ARRANGEMENT

Filed Oct. 22, 1964 2 Sheets-Sheet 1

INVENTOR
WILLIAM ROSS AIKEN
BY Kurt Kaufman

STEREOPHONIC SOUND REPRODUCING ARRANGEMENT

Filed Oct. 22, 1964 2 Sheets-Sheet 2

INVENTOR
WILLIAM ROSS AIKEN

BY

United States Patent Office 3,388,217

Patented June 11, 1968

3,388,217

STEREOPHONIC SOUND REPRODUCING ARRANGEMENT

William R. Aiken, 10410 Magdalena Ave., Los Altos Hills, Calif. 94022

Filed Oct. 22, 1964, Ser. No. 405,796

12 Claims. (Cl. 179—1)

ABSTRACT OF THE DISCLOSURE

A stereophonic sound system comprising plural sound transmitting channels each having a volume expander circuit including means operative to provide different volume levels in response to control voltages, means for developing control voltages for said volume level changing means varying in proportion with the sum of the individual signal voltages transmitted through said channels, said control voltage developing means including individual resistors of relatively large size and a common resistor of relatively small size connected in series between said channels and ground, and means for applying said control voltages jointly to said volume level changing means in the volume expanding circuits of said channels.

The present invention relates to electronic sound reproducing systems of the type employing automatic volume expanders or audio expressors. Automatic volume expanders are circuits that operate to restore the dynamic volume range of an original performance which has been compressed to facilitate recording and/or broadcasting, and audio expressors are circuits that do not only operate to restore the dynamic volume range of a recorded or broadcast performance during reproduction thereof but also operate to vary the relative strength of portions of the audio range at different volume levels to compensate for differences in the perception of the human ear for different frequencies of the audio range at different volume levels. The present invention relates specifically to sound reproducing systems that employ several speakers to provide simultaneously several stereophonically related sound reproductions. Such systems reproduce simultaneously recordings or broadcasts of one and the same performance as perceived from different locations of an auditorium so as to simulate the conditions of perception of the original performance in the auditorium.

When the several sound reproducing devices employed in stereophonic sound reproducing systems are provided with volume expanders or audio expressors, the control of the volume of the individual sound reproducing devices presents a problem. One would ordinarily assume that each sound reproducing device should be allowed to expand or contract the volume of its output under guidance of its own automatic volume expander or audio expressor. In practice, however, the result of such an arrangement is far from what a listener appears to hear, who is actually present at the original performance. As perceived from different audition points, the volume of an original performance appears to vary to different degrees and in a different manner depending upon the manner in which the various instruments are arranged on the stage. If certain instruments on one side of an auditorium enter the performance, or increase their volume, a microphone located in the proximity of these instruments will register a larger increase in the volume of the performance than a microphone located at the other side of the auditorium. If the recordings taken through two, thus differently located microphones are simultaneously reproduced by different sound reproduction devices whose output volume is automatically expanded by independent volume expanders or audio expressors, the renditions of one type of instrument may seem excessively expanded as compared with the renditions of other types of instruments in the orchestra and may draw the listener's attention to a degree which it does not warrant and which is out of proportion. As a result thereof, the stereophonic reproduction assumes at times a strangely unnatural, shrill and lifeless character.

It is an object of this invention to appropriately control the operation of volume expanders and/or audio expressors in stereophonic sound reproducing systems of the type described, to provide a balanced and life-like rendition of the reproduction of a recorded or broadcast performance.

Another object of the invention is to provide for the automatic volume expanders and/or audio expressors contained in a stereophonic sound reproducing system an interrelated control that maintains isolation between the individual sound reproducing devices.

Still another object of the invention is to provide a simple and inexpensive control arrangement for the volume expanders or audio compressors contained in the several sound reproducing devices of a stereophonic sound reproducing system.

These and other objects of the present invention will be apparent from the following description of the accompanying drawings which illustrate certain preferred embodiments thereof and wherein FIGURE 1 is a block diagram illustrating the principles of my invention;

In accordance with the invention I control the operation of the volume expanders and/or audio expressors contained in a stereophonic sound reproducing system by a control voltage which is arranged to vary in proportion with the algebraic sum of the varying input signals. In this manner the volume of no single of the sound reproductions can ever increase disproportionately by itself to attract undue attention of the listener's ear; for when the volume of any one of the sound reproductions increases substantially, the volume of the other sound reproduction or reproductions increases likewise to some extent. As a result, the over-all rendition of the stereophonic reproduction appears at all times well balanced to the listener's ear and has a life-like quality approximating the quality of perception of a listener that attends the original performance from a centrally located point of the auditorium.

Figure 1:
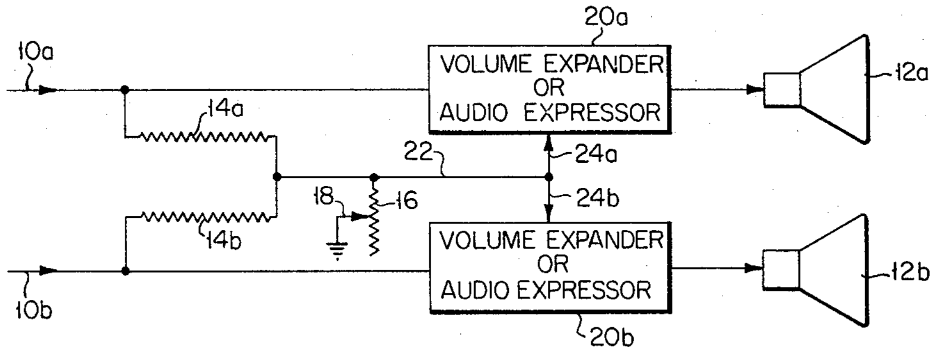

A practical way of obtaining such a control voltage is illustrated in FIGURE 1. Voltages from the input lines **10*a* and 10*b* of two stereophonic sound reproducing devices 12*a* and 12*b*, respectively, are developed across separate resistors 14*a* and 14*b* and a common resistor 16 that is connected in series with both the resistors 14*a* and 14*b*. The series resistor 16 is preferably a rheostat whose control arm 18 is connected to ground. The two input signals are applied to the two separate sound reproducing devices 12*a* and 12*b* through individual volume expanders or audio expressors which are represented by the blocks 20*a* and 20*b*. The performance of said volume expanders or audio expressors is controlled by the voltages developed across the active part of the rheostat 16, as indicated by the lead 22 and the leads 24*a* and 24*b***.

When the parallel resistors **14*a* and 14*b*** are of equal size and are large as compared with the active part of the rheostat 16, the changes in the voltages developed across the rheostat are approximately proportional to the changes in the algebraic sum of the voltages derived from the input lines 10*a* and 10*b*. The fact that the parallel resistors 14*a* and 14*b* are large as compared with the active part of the series-connected rheostat 16 furnishes the added advantage of isolating the separate sound-reproducing devices 12*a* and 12*b* effectively from each other in spite of the common control of their volume expanders or audio expressors 20*a* and 20*b*, respectively, through the rheostat 16. Hence no noticeable cross talk can occur.

Figure 2:
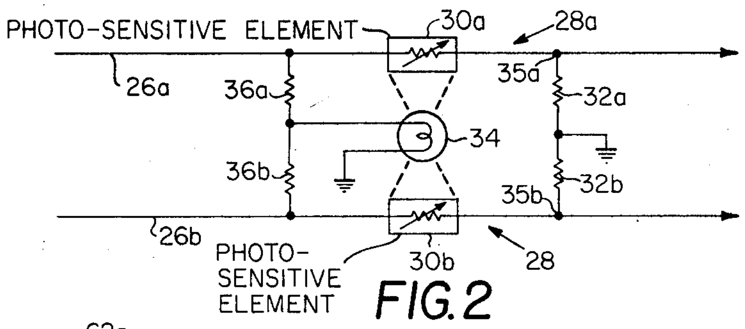
FIGURE 2 is a circuit diagram of a practical embodiment of my invention.

FIGURE 2 shows a practical circuit diagram, in its simplest form, of the arrangement illustrated in FIGURE 1. The reference numeral 26*a* designates the input line of one sound-reproducing device of a stereophonic sound-reproducing system and the reference numeral 26*b* designates the input line of another sound-reproducing device of the system. Line 26*a* contains a volume expander 28*a* which is formed by a variable resistor, such as the photo-sensitive resistor 30*a*, and a fixed resistor 32*a* connected in series between the input line 26*a* and ground. Similarly, line 26*b* contains a volume expander 28*b* formed by the photo-sensitive resistor 30*b* and the fixed resistor 32*b* which is connected in series between line 26*b* and ground. Both the photo-sensitive resistors 30*a* and 30*b* are exposed to illumination from a common appropriately placed lamp 34. The brighter the light emitted by the lamp 34, the lower will be the resistance value of the photo-sensitive resistors 30*a* and 30*b*, and the larger will be the voltages taken off at the junction points 35*a* and 35*b* between the photo-sensitive resistors 30*a*, 30*b* and the fixed resistors 32*a*, 32*b*, respectively. The lamp 34 is energized by voltages derived directly from the input lines 26*a* and 26*b* through resistors 36*a* and 36*b*, respectively, whose low voltage ends are connected and whose junction point 38 is grounded through the lamp 34. In the embodiment of the invention illustrated in FIGURE 2, the resistors 36*a* and 36*b* correspond to the separate resistors 14*a* and 14*b* of the diagram shown in FIGURE 1 and the lamp 34 itself constitutes the common series-connected resistor 16 of the diagram of FIGURE 1.

Whenever the volume of one or both of the signals applied to the input lines 26*a* and 26*b* increases, the brightness of the lamp 34 increases in a manner approximately proportional to the sum of the voltage changes of said signals. The increased brightness of the lamp 34 is effective to decrease the value of both the photo-sensitive resistors 30*a* and 30*b*, and consequently both the output voltages developed across the stationary resistors 32*a* and 32*b* increase in proportion. Since the brightness of the lamp 34 depends upon the sum of the two signal voltages applied to the volume changers 35*a* and 35*b*, respectively, and the photo-sensitive resistors 30*a* and 30*b* of both said volume changers are controlled by one and the same source of light, an increase (or decrease) in the volume of the signal arriving on one line will always have some effect upon the volume of the signal applied to the sound reproducing device along the other line, even though the volume of the signal arriving on said other line may have remained unchanged. In this manner disproportionately sounding changes in the output volume of one sound-reproducing device as compared with the performance of the other sound-reproducing device are avoided, and the overall rendition of the reproduced performance has a pleasing life-like quality.

Figure 3:
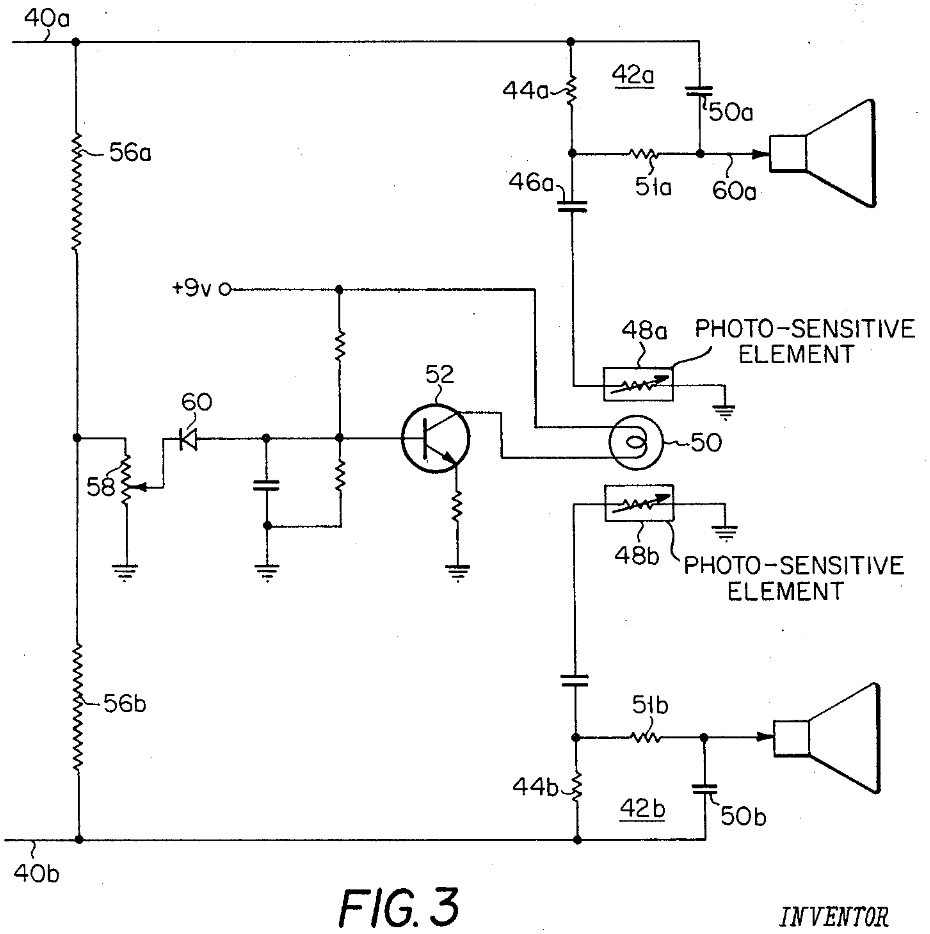
FIGURE 3 is a circuit diagram of another practical embodiment of the invention.

FIGURE 3 illustrates a practical circuit diagram of a more sophisticated embodiment of the invention wherein the individual channels are provided with "audio expressors" of the type disclosed in my copending U.S. patent application No. 76,016 filed on Dec. 15, 1960. In the embodiment of the invention illustrated in FIGURE 3 signals applied to the input lines 40*a* and 40*b* are passed through frequency-selective filters 42*a* and 42*b*, respectively, which are composed of identical components that bear the same reference numerals but are separately identified by the suffix letters *a* and *b*, respectively. Each of said filters comprises a fixed resistor 44, a condenser 46 and a variable resistor 48 connected in series between the input line and ground, with the first resistor shunted by a condenser 50 and a resistor 51. The variable resistor 48 while forming an integral part of the frequency selective filter so that any variations in its value modify the performance of the filter, is so located within the filter that any variation in its value affects simultaneously the amplitude of the filter output. Both the variable resistors 48*a* and 48*b* are photo-sensitive resistor elements and both are exposed to illumination from a common source of light, such as the lamp 50. The flow of current through the lamp and hence its degree of brightness are regulated by a transistor 52 whose collector and emitter are connected between a source of power 54 and ground, and whose conductivity from collector to emitter depends upon the value of a control voltage that is applied to its base. For developing said control voltage, the input lines of both audio expressors 42*a* and 42*b* are connected across separate resistors 56a and 56*b* of a relatively large value to a common potentiometer 58 in series with both said resistors; and a selected portion of the voltage developed across the potentiometer is applied as a direct current through a rectifier 60 to the base of the transistor 52.

When the volume of one or the other of the signals applied to the input lines 40*a* and 40*b* varies, the voltage tapped off by the arm of the potentiometer 58 varies in proportion with the variations in the sum of the signals applied to the input lines, and the control voltage applied to the base of the transistor by the rectifier 60 changes correspondingly to increase or decrease, as the case may be, the emitter-collector conductivity of the transistor 52. Accordingly the light emitted by the lamp 50 shines brighter or dims in inverse proportion with the algebraic sum of the voltages applied to the two input lines. The variations in the intensity of the light emitted by the lamp 50 change the resistance values of the two photo-sensitive resistor elements 48*a* and 48*b* in the opposite direction, i.e. decrease said values as the light becomes brighter and increase said values as the light dims, and consequently increase the volume of the signals appearing in the output lines 60*a* and 60*b* of the audio compressors when the sum of the input voltages increases, or decrease the volume of said output signals when the sum of the input voltage decreases. The variations in the value of the photo-sensitive resistor elements brought about by the variations in the light emitted by the lamp 52, have the added effect of decreasing or increasing the frequency characteristics of the audio expressors 42*a* and 42*b* so that the volume of the low and high frequencies of the output signals relative to the middle frequencies of the audio range increases as the volume levels of the applied signals decrease.

Figure 4:
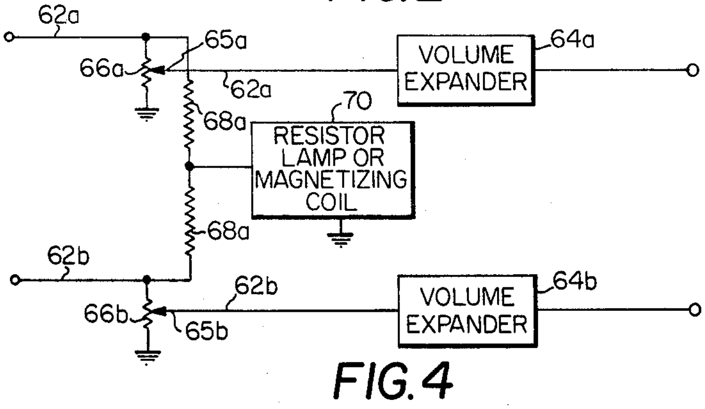
FIGURE 4 is a block diagram illustrating the manner in which the automatic volume control arrangement of my invention for stereophonically operating sound reproducing devices may be located relative to the manually operable volume controls with which such sound reproducing devices are usually equipped.

FIGURE 4 illustrates the manner in which the control circuitry of my invention is preferably located with respect to the manually operable volume controls with which sound-reproducing devices are usually equipped. In FIGURE 4 the reference numerals 62*a* and 62*b* identify the input lines of the system and the blocks 64*a* and 64*b* identify volume expanders or audio expressors of the type illustrated in FIGURES 2 and 3. Potentiometers 66*a* and 66*b* connected between the input lines 62*a* and 62*b* ground, with their adjustable arms 65*a* and 65*b* connected to the volume expanders or audio expressors 64*a* and 64*b*, respectively, operate as manually adjustable volume controls to decrease or increase the output level of the volume expanders or audio expressors at will. The voltages for the automatic control of the volume expanders or audio expressors 64*a* and 64*b* are derived from the input lines 62*a* and 62*b* at points ahead of the manually adjustable volume controls 66*a* and 66*b*, as indicated by the resistors 68*a* and 68*b* which are connected to the input lines 62*a* and 62*b* at the high potential ends of the potentiometers 66*a* and 66*b*, respectively. The block 70 to which the junction point of the resistors 68*a* and 68*b* is connected, represents the common resistor across which the control voltage is developed, which may be a lamp such as the lamp 34 in FIGURE 2 or a magnetizing coil such as the coil 84 in FIGURE 5—which are in fact parts of the volume expanders—or a potentiometer, such as the potentiometer 58 in FIGURE 3, and the lines 74*a* and 74*b* indicate that the operation of the volume expanders or audio expressors 64*a* and 64*b* is jointly controlled by the voltages developed by whatever component is represented by the block 70.

Figure 5:
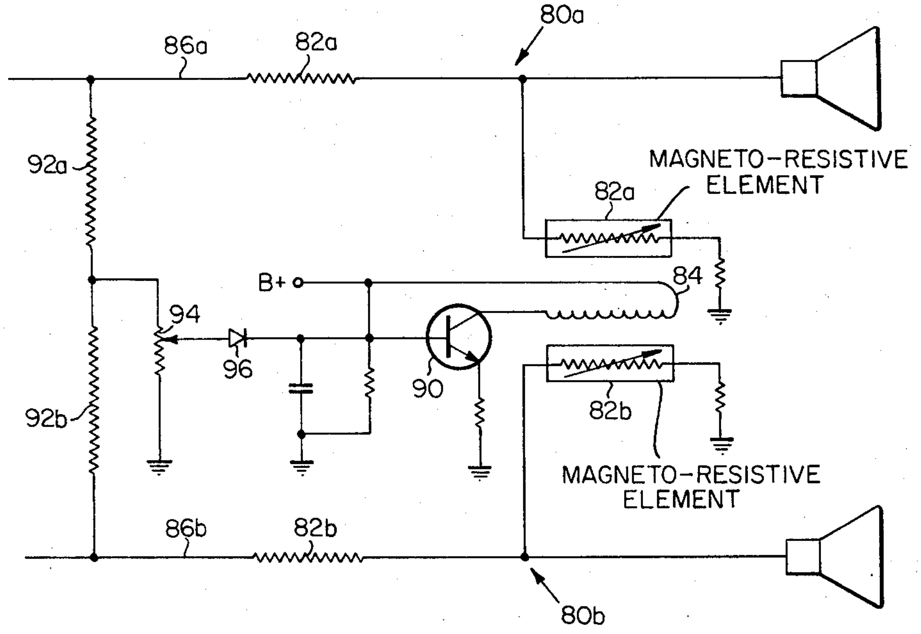
FIGURE 5 is a circuit diagram of yet another embodiment of the invention.

In the specific embodiments of the invention represented by FIGURES 2 and 3 the volume expanders 28*a* and 28*b* and the audio expressors 42*a* and 42*b* were shown and described as containing photo-sensitive resistor elements 30*a*, 30*b* and 48*a*, 48*b*, respectively, as conductive level determining elements, whose resistance values were appropriately controlled by variations in the degree of illumination of a source of light to which the photo-sensitive elements in both stereophonically related sound reproducing devices were exposed. FIGURE 5 illustrates another embodiment of the invention wherein the conductive level determining elements of the volume expanders 80*a* and 80*b* are formed by magneto resistors 82*a* and 82*b*, respectively, which may be made from semi-metals and may jointly be exposed to a magnetic field generated by an intermediately located magnetizing coil 84.

The electrical resistance value of the magneto resistors increases as the intensity of the magnetic field to which they are exposed increases. Accordingly the arrangement illustrated in FIGURE 5 differs from the arrangement illustrated in FIGURE 2 in that the fixed resistors 82*a* and 82*b* are located in the input lines 86*a* and 86*b*, respectively, and the output voltages of the arrangement are developed across the magneto resistors 88*a* and 88*b*. As in the case of the lamp 50 in the arrangement illustrated in FIGURE 3, the degree of energization of the magnetizing coil 84 is controlled by a transistor 90 whose emitter and collector are connected in the power circuit of the magnetizing coil and whose emitter/collector conductance is controlled by a D.C. voltage that is applied to its base. Said control voltage is derived by grounding the input lines 86*a* and 86*b* across separate resistors 92*a* and 92*b*, respectively, of relatively large resistance values and a common resistor represented by the potentiometer 94 that is connected in series with both said resistors 92*a* and 92*b*; and the voltage developed across the low voltage portion of the potentiometer 94 and taken off by the adjustable arm of the potentiometer is applied as a direct current voltage to the base of the transistor 90 through a rectifier indicated at 96.

While the hereinbefore embodiments of the invention are arranged to control the volume expanders and/or audio expressors contained in the several sound reproduction devices of a stereophonic sound reproducing system in proportion with the variations in the sum of the signals applied to the individual sound reproducing devices, the arrangement of my invention may also be employed to control the operation of the sound expander and/or audio expressors in proportion with the strongest of the signals applied to sound reproducing devices. For this purpose it is merely necessary that the separate resistors across which the incoming signal voltages are taken off the input lines be made small and the common resistor across which the actual control voltage is developed, be made large.

While I have described my invention with the aid of certain preferred embodiments thereof, it will be understood that the invention is not limited to the specific circuit components and arrangements illustrated and described by way of example, which may be departed from without departing from the scope and spirit of my invention. Thus, while the preferred embodiments of the invention illustrated in the accompanying drawings and described in the specification all employ a single common element, such as the lamp 34 (FIGURE 2) the lamp 50 (FIGURE 3) or the magnetizing coil 84 (FIGURE 5) for appropriately changing the resistance values of the various variable resistance elements in the volume expanders and audio expressors of the different sound reproducing devices contained in the stereophonic sound reproducing system, each of said variable resistor elements may be provided with its own control element, and the control-voltage-developing circuitry of the invention may be arranged to regulate the performance of these several control elements.

Wherever in the appended claims the term "volume expanding circuit" is employed, it is intended to include audio expressor circuits of the type described hereinbefore in the specification and illustrated in FIGURE 3.

I claim:

1. A stereophonic sound reproducing system comprising plural sound reproducing devices each having a volume expander circuit including a photo-sensitive resistance element, a source of light for varying the resistance values of the photo-sensitive resistance elements of said volume expander circuits, and means for varying the degree of illumination of said source of light in proportion with the sum of the individual signal input voltages applied to said volume expanders.

2. A stereophonic sound reproducing system comprising plural sound reproducing devices each having an input line and a volume expander circuit including a photo-sensitive resistor element, a lamp for illuminating said resistor elements, said lamp having a power circuit including a variable current flow control element, and means for controlling the degree of illumination of said lamp in proportion with the algebraic sum of the signal voltages applied to the expander circuits including individual resistors and a common resistor connected in series between said input lines and ground, and means for regulating said current flow control element with the voltages developed across said common resistor.

3. A stereophonic sound reproducing system comprising plural sound reproducing devices each having an input line and a volume expander circuit including a photo-sensitive resistor element, a common lamp for illuminating said resistor elements, said lamp having a power circuit including a variable current flow control element, and means for controlling the degree of illumination of said lamp including individual resistors of relatively large size and a common resistor of relatively small size connected in series between said input lines and ground, and means for regulating said current flow control element with the voltages developed across said resistor.

4. A stereophonic sound reproducing system comprising plural sound reproducing devices each having a manually adjustable volume level control circuit and an automatic volume expander circuit including means operative in response to a control voltage to provide different conductive levels, and means for developing control voltages for said conductive level changing means and in this manner control the signal output volume of said expander circuits including means for grounding the signal voltages applied to said automatic volume expander circuits across a common resistor from points ahead of said manually adjustable volume level control circuit.

5. A stereophonic sound reproducing system comprising plural sound reproducing devices each having a manually adjustable volume level control circuit and an automatic volume expander circuit including a photo-sensitive resistance element, a source of light for illuminating the photo-sensitive resistor elements of the volume expander circuits comprised in the system, and means for controlling the degree of illumination of said source of light and in this manner control the signal output volumes of said expander circuits including means for grounding the signal input voltages across a common resistor from points ahead of said manually adjustable volume level control circuits.

6. A stereophonic sound reproducing system comprising plural sound reproducing devices each having a manually adjustable volume level control circuit and an automatic volume expander circuit including a photo-sensitive resistor element, a common source of light for illuminating the photo-sensitive resistor elements of the volume expander circuits comprised in the system, and means for controlling the degree of illumination of said source of light in proportion with the algebraic sum of the signal input voltages including means for grounding the individual signal input voltages across individual resistors of relatively large size and across a common resistor of relatively small size connected in series with said individual resistors from points ahead of said manually adjustable volume level control circuits.

7. A stereophonic sound reproducing system comprising plural sound reproducing devices having input lines and volume expander circuits including magneto-resistance members, a common magnetizing coil for subjecting the magneto-resistance members of the volume expander circuits jointly to a magnetic force field, and means for varying the intensity of the magnetic force field generated by said magnetizing coil.

8. A stereophonic sound reproducing system comprising plural sound reproducing devices having input lines and volume expander circuits including magneto-resistance members, a magnetizing coil for subjecting the magneto-resistance members of the volume expander circuits jointly to a magnetic force field, and means for varying the intensity of the magnetic force field generated by said magnetizing coil in proportion with the sum of the individual signal voltages applied to said volume expander circuits.

9. A stereophonic sound reproducing system comprising plural sound reproducing devices having input lines and volume expander circuits including magneto-resistance members, a magnetizing coil for subjecting the magneto-resistance members of the volume expander circuits to a magnetic force field, and means for varying the intensity of the magnetic force field generated by said magnetizing coil including individual resistors of relatively large size and a common resistor of relatively small size connected in series between the input lines of said sound reproducing devices and ground.

10. A stereophonic sound reproducing system comprising plural sound reproducing devices having input lines and volume expander circuits including magneto-resistance members, a common magnetizing coil for subjecting the magneto-resistance members of the volume expander circuits jointly to a magnetic force field, and means for varying the intensity of the magnetic force field generated by said magnetizing coil in proportion with the algebraic sum of the signal voltages applied to said volume expander circuits including individual resistors of relatively large size and a common resistor of relatively small size connected in series between the input lines of said sound reproducing devices and ground.

11. A stereophonic sound system comprising plural electronic sound transmitting channels each including a volume expanding circuit, means for developing a common control voltage for said volume expanding circuits, and means for applying said common control voltage jointly to said volume expanding circuits.

12. A stereophonic sound system comprising plural electronic sound transmitting channels each including a volume expanding circuit, means for developing for said volume expanding circuits a common control voltage varying in proportion to the sum of the individual signal voltages applied to the individual channels, and means for applying said control voltage jointly to said volume expanding circuits.

References Cited

UNITED STATES PATENTS

| | | | |
|---|---|---|---|
| 2,481,911 | 10/1949 | De Boer et al. | 179—1.3 |
| 3,162,728 | 12/1964 | Pfister | 179—1.3 |
| 3,229,038 | 1/1966 | Richter | 179—1.3 |

KATHLEEN H. CLAFFY, *Primary Examiner.*

D. L. STEWART, *Assistant Examiner.*